United States Patent
Sohma et al.

(10) Patent No.: US 8,385,656 B2
(45) Date of Patent: Feb. 26, 2013

(54) IMAGE PROCESSING APPARATUS, IMAGE PROCESSING METHOD AND PROGRAM

(75) Inventors: Hidetomo Sohma, Yokohama (JP);
Hirotaka Shiiyama, Yokohama (JP);
Masahiro Matsushita, Yokohama (JP);
Koichi Magai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 606 days.

(21) Appl. No.: 12/603,427

(22) Filed: Oct. 21, 2009

(65) Prior Publication Data

US 2010/0104197 A1    Apr. 29, 2010

(30) Foreign Application Priority Data

Oct. 23, 2008  (JP) .................. 2008-273187
Oct. 23, 2008  (JP) .................. 2008-273188

(51) Int. Cl.
*G06K 9/46*    (2006.01)
(52) U.S. Cl. ...................................... 382/195
(58) Field of Classification Search ............... 382/181, 382/190, 195, 209, 224, 225, 305, 218, 298, 382/299
See application file for complete search history.

(56) References Cited

U.S. PATENT DOCUMENTS

| 7,006,714 B2* | 2/2006 | Kasutani ................. 382/305 |
| 7,933,455 B2* | 4/2011 | Haupt et al. ............. 382/224 |
| 2005/0078869 A1* | 4/2005 | Kim ..................... 382/190 |

FOREIGN PATENT DOCUMENTS

| JP | 8-249349 A | 9/1996 |
| JP | 9-44665 A | 2/1997 |

OTHER PUBLICATIONS

Schmid, Cordelia and Mohr, Roger, Local Greyvalue Invariants for Image Retrieval, IEEE Trans. PAMI, vol. 19, No. 5, pp. 530-535, 1997.

* cited by examiner

*Primary Examiner* — Daniel Mariam
(74) *Attorney, Agent, or Firm* — Canon USA, Inc., IP Division

(57) ABSTRACT

An image processing apparatus reduces two input images to be compared by the predetermined number of times to generate two image groups, extracts a plurality of feature points and a local feature amount of each feature point from these image groups, and determines a combination of feature points in which local feature amounts are similar to each other, between the image groups. Then, the image processing apparatus determines a relation of a reasonable combination, assigns high weights to the reasonable combination, and calculates a similarity degree between the two input images.

11 Claims, 11 Drawing Sheets

FIG. 5
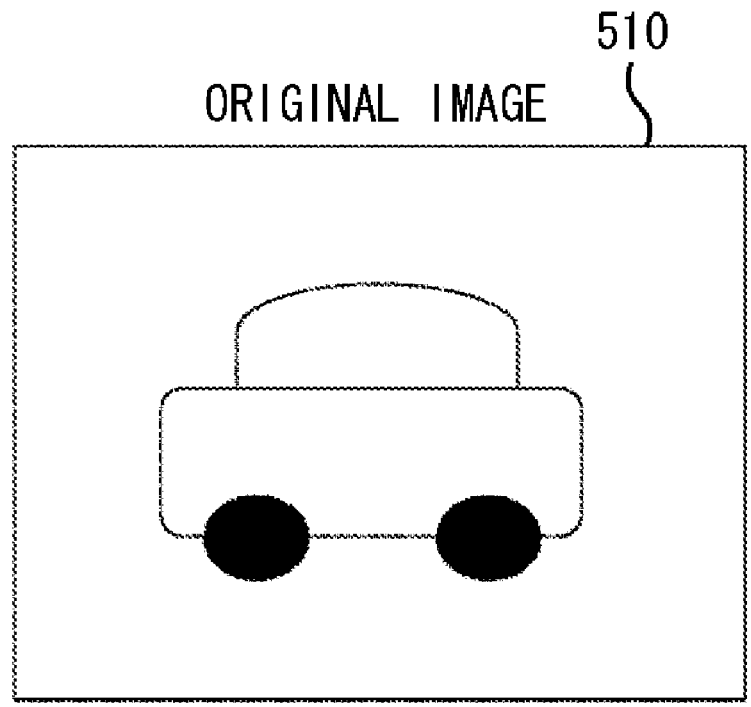
ORIGINAL IMAGE 510
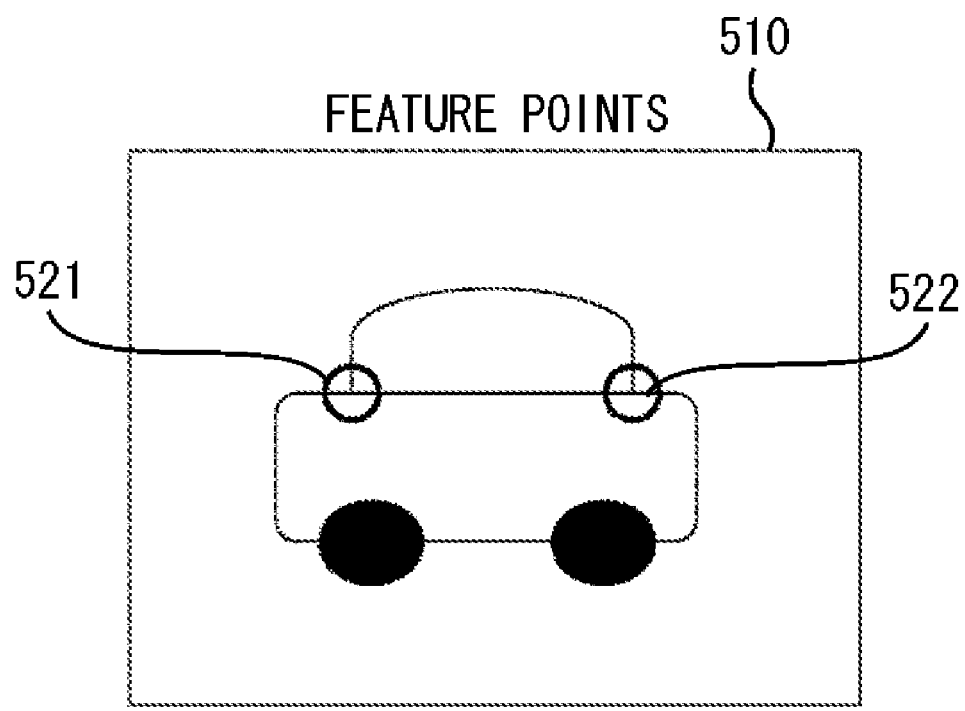
FEATURE POINTS 510
521  522

IMAGE PROCESSING APPARATUS, IMAGE PROCESSING METHOD AND PROGRAM

BACKGROUND OF THE INVENTION

1. Field of the Invention

The present invention relates to a technique for extracting a local feature from an image, compares each image, and calculates a similarity degree.

2. Description of the Related Art

There is a technique to search an image similar to a query image from a database or the like using an image as a search query. For example, Japanese Patent Application Laid-Open No. 08-249349 discusses a method in which an image is divided into a plurality of blocks and an image feature amount of a block in the same position is compared to make a comparison of similarity between two images by using an image feature amount (representative color) of each block. However, in the method discussed in Japanese Patent Application Laid-Open No. 08-249349, it is difficult to determine that the similarity is high, for example, when images are compared before and after a specified object in an image are cut off, or the position of the object is changed is compared.

Thus, a method for comparing or searching an image using a local feature amount of an image (hereinafter, referred to as a local feature amount) is discussed in Japanese Patent Application Laid-Open No. 09-44665, and C. Schmid and R. Mohr "Local gray value invariants for image retrieval", IEEE trans. PAML, Vol. 10, No. 5, pp 530 to 535, 1997.

In these methods, first, a feature point which definitely represents a feature of the image is extracted from a luminance distribution or the like. (These feature points are extracted by referring to distribution information generated by differentiating the luminance distribution in an x direction and a y direction. Thus, many of the feature points appear at an edge on the luminance distribution). Next, a local feature amount concerning its feature point is calculated from a neighboring image value containing its feature point. A value referred to as a local feature amount, includes varieties such as a pixel value, a luminance value, a shape, and a texture pattern. When an image is compared, the local feature amount of each image is compared with each other.

First, with respect to a plurality of feature points extracted from two images to be compared, local feature amounts that each feature point possesses are compared. Thus, a combination of feature points of two images which show a similar local feature amount is determined. The combination of feature points has a relation of 1:1. Then, similarity of two images is determined based on whether the degree of geometrical correspondence is satisfied as to the combination of feature points.

In a case where a size of an image is reduced, as to images before and after reduction, a position (or presence or absence) of a feature point extracted from the same location, or a value of a local feature amount concerning its feature point may fluctuate. It is desired that similarity with a query image can be determined as to an image containing a reduced content of an object included in a query image. Thus, both comparison target images are subjected to stepwise reduction conversion with a predetermined reduction ratio and multiple images having stepwise resolutions are generated. Then, a feature point and a local feature amount are extracted from the multiple images. The feature points and the local feature amounts thus extracted from the multiple images generated in such a manner are collectively utilized. Thus, even when images before and after reduction are compared with each other, it can be determined that similarity is high.

When a combination of feature points is determined between two images, if only a local feature amount about which two feature points show similarity is selected as described above, an erroneous combination may occur. (Refer to combination 733 in FIG. 7) This erroneous combination also affects determination of other combinations and reduces comparison accuracy.

SUMMARY OF THE INVENTION

The present invention is directed to an image processing apparatus including a conversion unit configured to reduce an input image by a predetermined number of times to generate an image group containing the input image; an extraction unit configured to extract a plurality of feature points and a local feature amount of each feature point from the image group; a first determination unit configure to compare a first image that a first image group generated from a first input image by the conversion unit includes, and a second image that a second image group generated from a second input image by the conversion unit includes, and to combine a feature point of the first image group and a feature point of the second image group; a second determination unit configured to determine a relation between the first image and the second image in which a size of an object of the first image and that of the second image get closer; and a calculation unit configured to assign high weights to a combination of feature points extracted from an image having the relation determined by the second determination unit to calculate a similarity degree between the first input image and the second input image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example that extracts a feature point.

DESCRIPTION OF THE EMBODIMENTS

Various exemplary embodiments, features, and aspects of the invention will be described in detail below with reference to the drawings.

Figure 1:
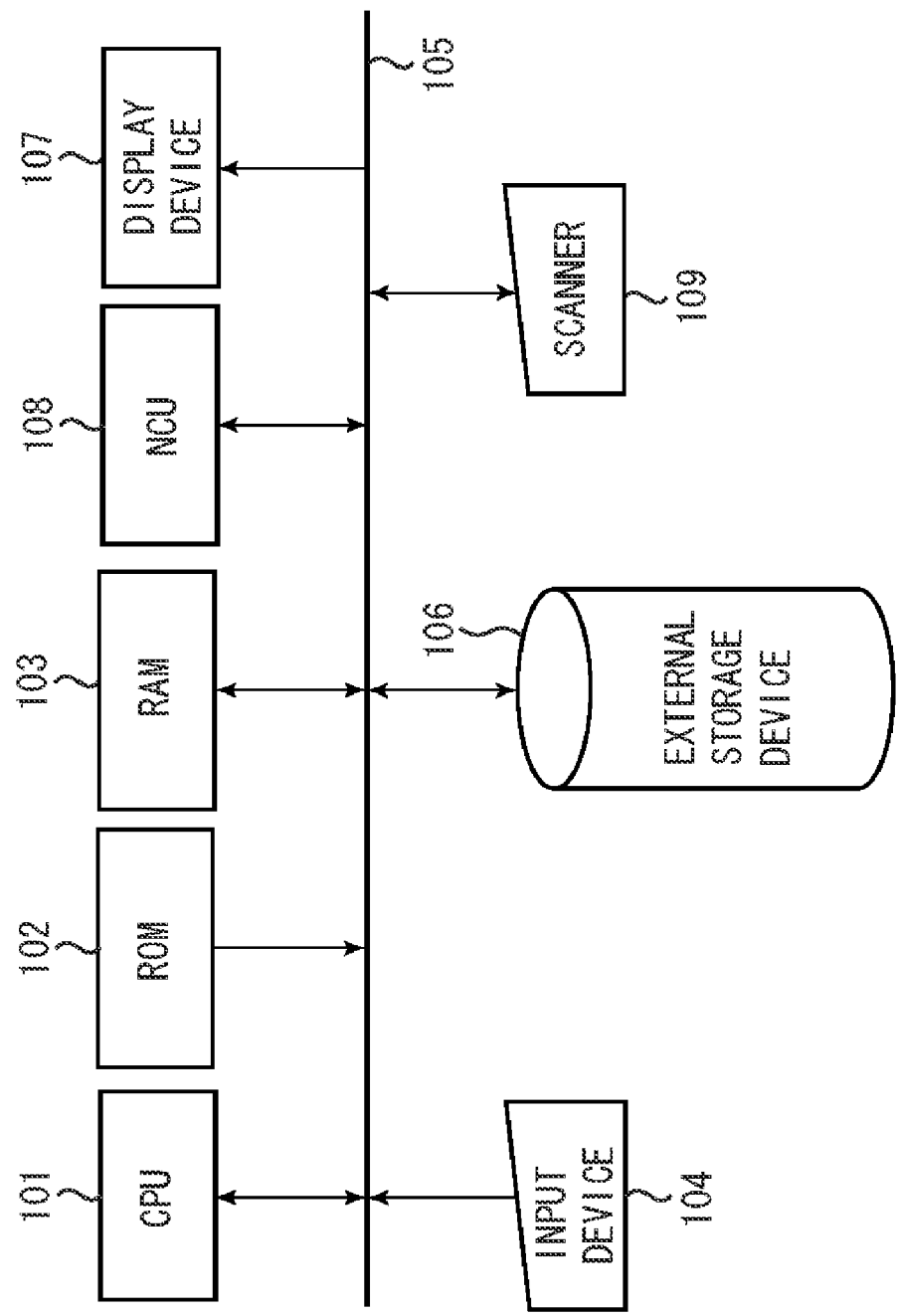
FIG. 1 illustrates a configuration of an image comparison apparatus.

FIG. 1 illustrates a schematic configuration of an image processing apparatus according to one exemplary embodiment of the present invention. This example includes the image processing apparatus as an image comparison apparatus. A central processing unit (CPU) 101 controls the image comparison apparatus.

A read only memory (ROM) 102 stores programs and data for causing the CPU 101 to execute control to realize the present invention. A random access memory (RAM) 103 stores programs for causing the CPU 101 to control the image comparison apparatus and also provides the CPU 101 with a work area. An input device 104 includes various input keys and cursor moving keys (or pointing device such as mouse). The input device 104 is configured to accept instructions of a user.

A bus 105 is an address bus which communicably connects each component of the image comparison apparatus, a data bus or the like. An external storage device 106 stores data or the like. For example, the external storage device 106 includes a hard disk, a floppy disk or the like. A display device 107 includes a display unit such as a liquid crystal display and displays the state of the image comparison apparatus to a user. A network control unit (NCU) 108 communicates with apparatuses (not shown in FIG. 1) which exist at a remote place via a network (local area network (LAN)) to enable sharing of programs and data in the present exemplary embodiment. The NCU 108 may be any device which can be connected to enable communication, for example, cable communication such as a Universal Serial Bus (USB), Institute of electrical and Electronics Engineers (IEEE) 1394, P1284, a small computer system interface (SCSI) and Ethernet, and radio communication such as Bluetooth, infrared communication, IEEE802.11b.

A scanner 109 is an image scanner for reading an image and optically reads set paper documents one by one. The scanner 109 converts an image signal into a digital signal sequence. Image data read by the scanner 109 can be stored in an external storage device, a RAM or the like.

Figure 2:
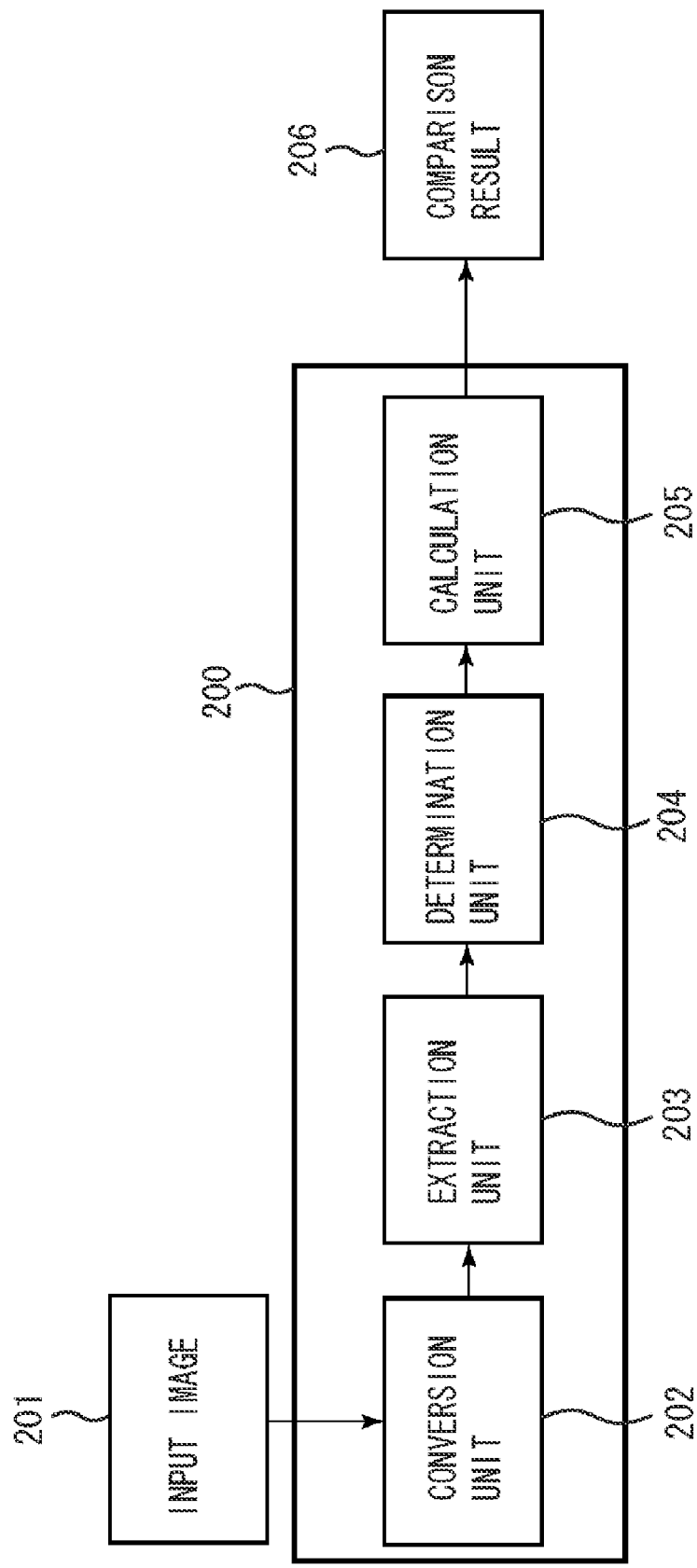
FIG. 2 illustrates an outline of comparison processing of an image.

FIG. 2 illustrates a schematic function of an image comparison apparatus 200. As shown in FIG. 2, the image comparison apparatus 200 includes a conversion unit 202, an extraction unit 203, a determination unit 204, and a calculation unit 205. In the image comparison apparatus 200, the conversion unit 202 reads an input image 201 and executes stepwise reduction processing with a predetermined reduction ratio, thereby generating an image group (above-described multiple images).

Then, the extraction unit 203 extracts a feature point and a local feature amount of each feature point from multiple images generated by the conversion unit 202. Each of two input images (first input image and second input image) to be compared is converted by the conversion unit 202 to generate a first image group and a second image group.

Next, the determination unit 204 compares local feature amounts for a plurality of feature points extracted from the first and the second image groups to be compared. Thus, the determination unit 204 determines a combination of feature points having similar local feature amounts between two images. Then, between an image of the first image group and an image of the second image group, the determination unit 204 determines a relation (ratio of reduction rate, difference in a number of reduction times) in which sizes of an object contained in images are close. Then, among combinations of feature points of the first and second image groups, the calculation unit 205 assigns higher weights to a combination which relates to determination of the determination unit 204 to calculate similarity between the first input image and the second input image.

Figure 3:
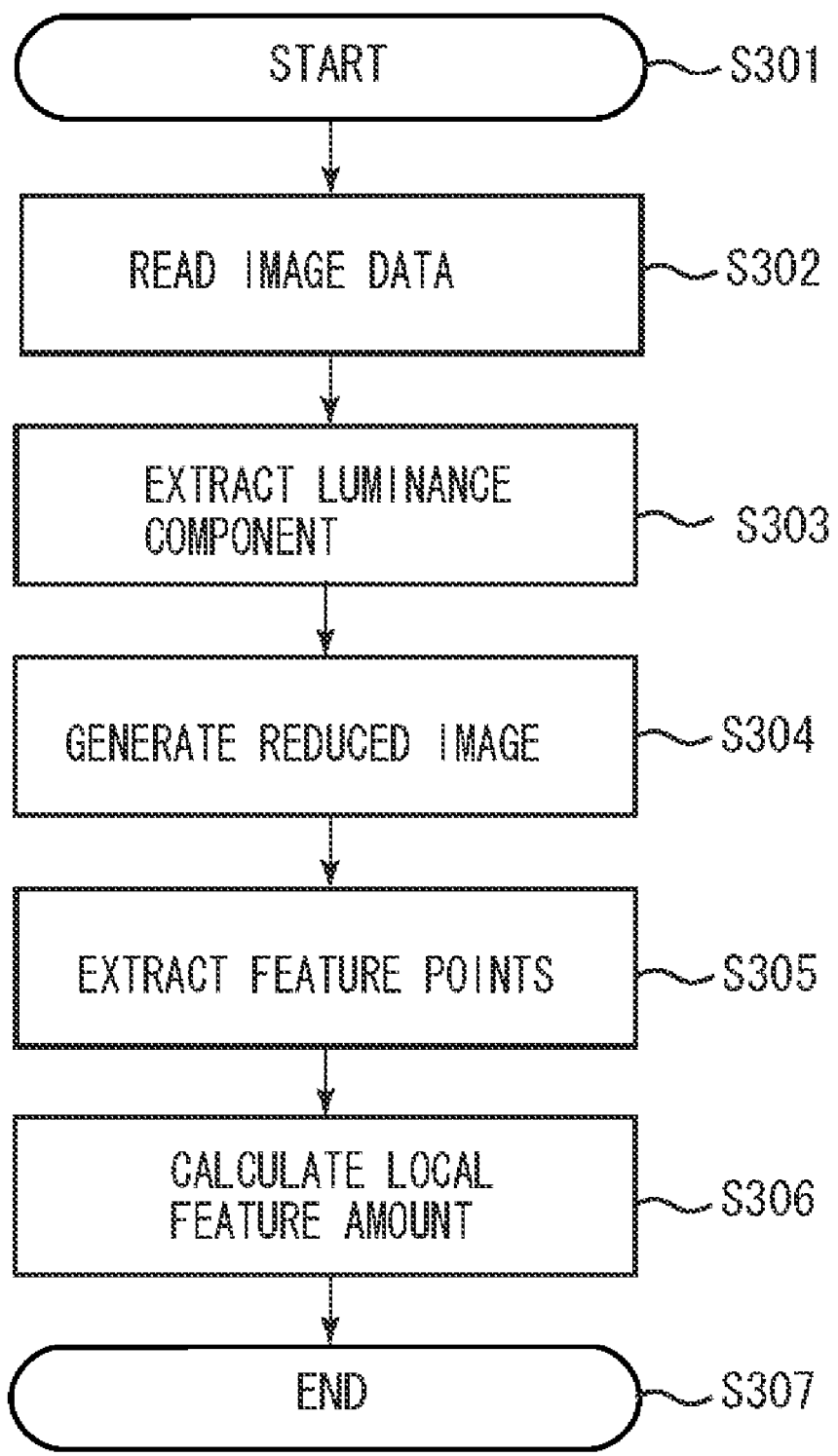
FIG. 3 illustrates a flow chart for calculating a local feature amount.

FIG. 3 illustrates a procedure for extracting a feature point and a local feature amount from an input image. In step S301, the processing is started. In step S302, the conversion unit 202 reads an input image. Next, in step S303, the conversion unit 202 extracts a luminance component of image data to generate a luminance component image (which corresponds to the above-described luminance distribution) based on the extracted luminance component.

Next, in step S304, the conversion unit 202 reduces the luminance component image generated in step S303 by n times with a reduction rate p to acquire multiple images of n+1 kinds of resolution. The reduction rate p and the number of reduced time n are predetermined. However, it is necessary that n is an integer of 1 or more.

Figure 4:
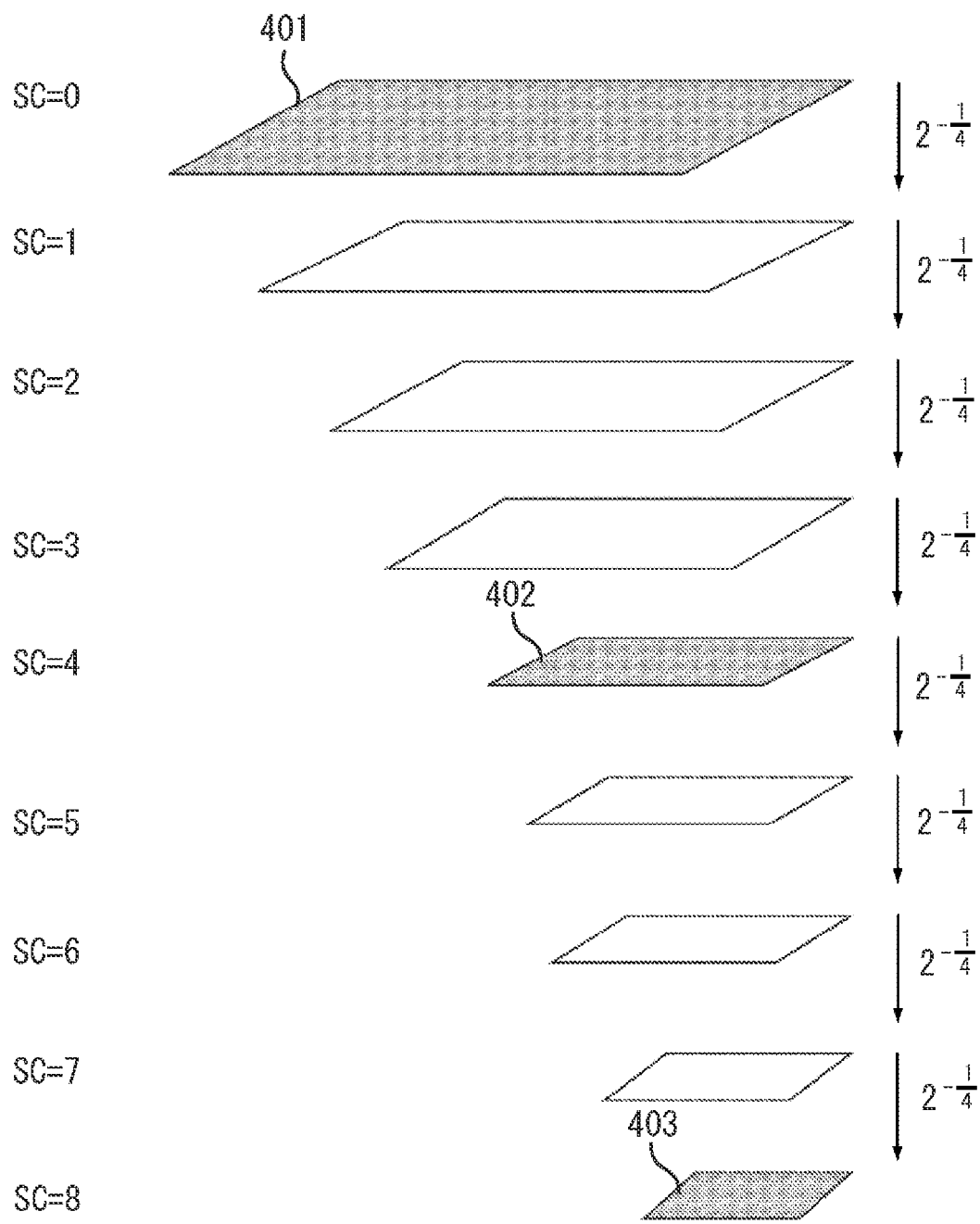
FIG. 4 illustrates an example that generates a reduced image.

FIG. 4 illustrates an example of a multiple image in which the conversion unit 202 reduces an image by 8 times with reduction rate of p=2 to the −(¼)th power. An image 401 is a luminance component image that the conversion unit 102 has extracted from the input image 101. (The image 401 may be the input image 101 itself). An image 402 is a reduced image of the luminance component image 401 by 4 times with the reduction rate p. An image 403 is a reduced image of the luminance component image 401 by 8 times with the reduction rate p. A number of reduction times is represented by SC. In the image 401, SC=0. In the image 403, SC=8.

In an example shown in FIG. 4, the image 402 is the luminance component image 401 reduced to ½. The image 403 is the luminance component image 401 reduced to ¼.

In this example, reduction conversion of an image is executed by linear interpolation. However, in addition to linear interpolation, as a method for executing reduction conversion of an image, simply thinning out a pixel, sampling after a low-pass filter is applied or the like may be employed.

Next, in step S305, the extraction unit 203 extracts a feature point. Specifically, the extraction unit 203 applies a Harris operator to each image shown in FIG. 4. In the Harris operator, as the degree of a change in a pixel value becomes larger, for sample, at an edge and a corner, a larger value is returned. Then, for the respective output images obtained by applying the Harris operator, pixel values (total 9 pixels) which include a target pixel and 8 pixels surrounding the target pixel are compared. Then, a target pixel which has a maximum pixel value among the 9 pixels and is not less than a threshold value is extracted as a feature point. In a feature point thus obtained, the degree of a change in a pixel value is large compared with the surrounding pixels and definitely represents the feature of an image.

Next, in step S306, with respect to each of feature points obtained by extracting feature points in step S305, a local feature amount concerning a feature point is calculated. Then, in step S307, the processing ends.

A local feature amount $V(x,y)$ is defined by the following equation (1):

$$v(x, y) = \begin{pmatrix} L \\ L_x L_x + L_y L_y \\ L_{xx} L_x L_x + 2L_{xy} L_x L_y + L_{yy} L_y L_y \\ L_{xx} + L_{yy} \\ L_{xx} L_{xx} + 2L_{xy} L_{xy} + L_{yy} L_{yy} \end{pmatrix} \quad (1)$$

V(x,y) is a local feature amount concerning a feature point present at coordinates (x,y) in an image. The coordinates described here indicate a pixel position in a digital image. The pixel position in the digital image is discrete (represented by integer). Thus, when the pixel position is specified from real number coordinates as a result of the calculation, it is necessary that the coordinates are provided by an integer. In the present exemplary embodiment, when coordinates are represented by a real number value, the real number value is rounded to provide an integer value. Thus, the pixel position is specified. A method for rounding a real number value includes rounding off, rounding up a number after a decimal point, and rounding down a number after a decimal point. In the present exemplary embodiment, any method may be selected. However, the method shall not be changed during operation.

A symbol used on the right side of equation (1) is defined by equations (2) to (7) described below. In this equation, G(x,y) on the right side in equation (2) is a Gaussian function, I(x,y) is a pixel value at coordinates (x,y) of an image, and "*" is a symbol which represents convolution operation. Further, equation (3) is a partial derivative of a variable L defined by equation (2) with respect to x. Equation (4) is a partial derivative of the variable L with respect to y. Equation (5) is a partial derivative of a variable Lx defined by equation (3) with respect to y. Equation (6) is a partial derivative of the variable Lx defined by equation (3) with respect to x. Equation (7) is a partial derivative of a variable Ly defined by equation (4) with respect to y.

$$L = G(x, y) * I(x, y) \quad (2)$$

$$L_x = \frac{\partial L}{\partial x} \quad (3)$$

$$L_y = \frac{\partial L}{\partial y} \quad (4)$$

$$L_{xy} = \frac{\partial^2 L}{\partial x \partial y} \quad (5)$$

$$L_{xx} = \frac{\partial^2 L}{\partial x^2} \quad (6)$$

$$L_{yy} = \frac{\partial^2 L}{\partial y^2} \quad (7)$$

Since G(x,y) is a Gaussian function, G(x,y) normally has a standard deviation σ as a variable. However, it is omitted in equation (2). In the present exemplary embodiment, it is predetermined as σ=ar, where a is a constant, and r indicates a radius of a circular area which centers around a target feature point. The circular area is also an area to be referred to when a local feature amount of a target feature point is calculated.

However, as long as a local feature amount can be calculated which indicates features of a pixel containing a feature point, and pixels in the vicinity of a feature point, a method other than the above-described one may also be employed. The above-described local feature amount includes five elements. However, the number of elements may not be five. For example, also to Software Implemented Fault Tolerance (SIFT) (number of elements is 128) and PCA-SIFT (number of elements is around 20 to 30), the present invention can be applied.

FIG. 5 illustrates an example of a feature point and a local feature amount obtained by extracting a feature point and a local feature amount of an image shown in FIG. 3. In FIG. 5, an image 510 is an input image, and feature points 521 and 522 extracted from an input image 501 are shown. The feature points 521 and 522 show a local feature amount determined by equation (1) respectively. When the Harris operator is used, a portion having a characteristic shape on a luminance image will be extracted as a feature point.

Further, the present exemplary embodiment is described using the Harris operator. However, as long as a location can be detected where fluctuation of a pixel value is large in an image, the present exemplary embodiment can be substituted by another processing.

When similarity of each image is calculated using a local feature amount, a combination of corresponding feature points is determined in an image group to be compared, to generate a corresponding point list. However, as described above, in a method in which similarity of each local feature amount is calculated and a combination of feature points in which similarity is maximized, is registered in a list, erroneous correspondence may occur.

Figure 7:
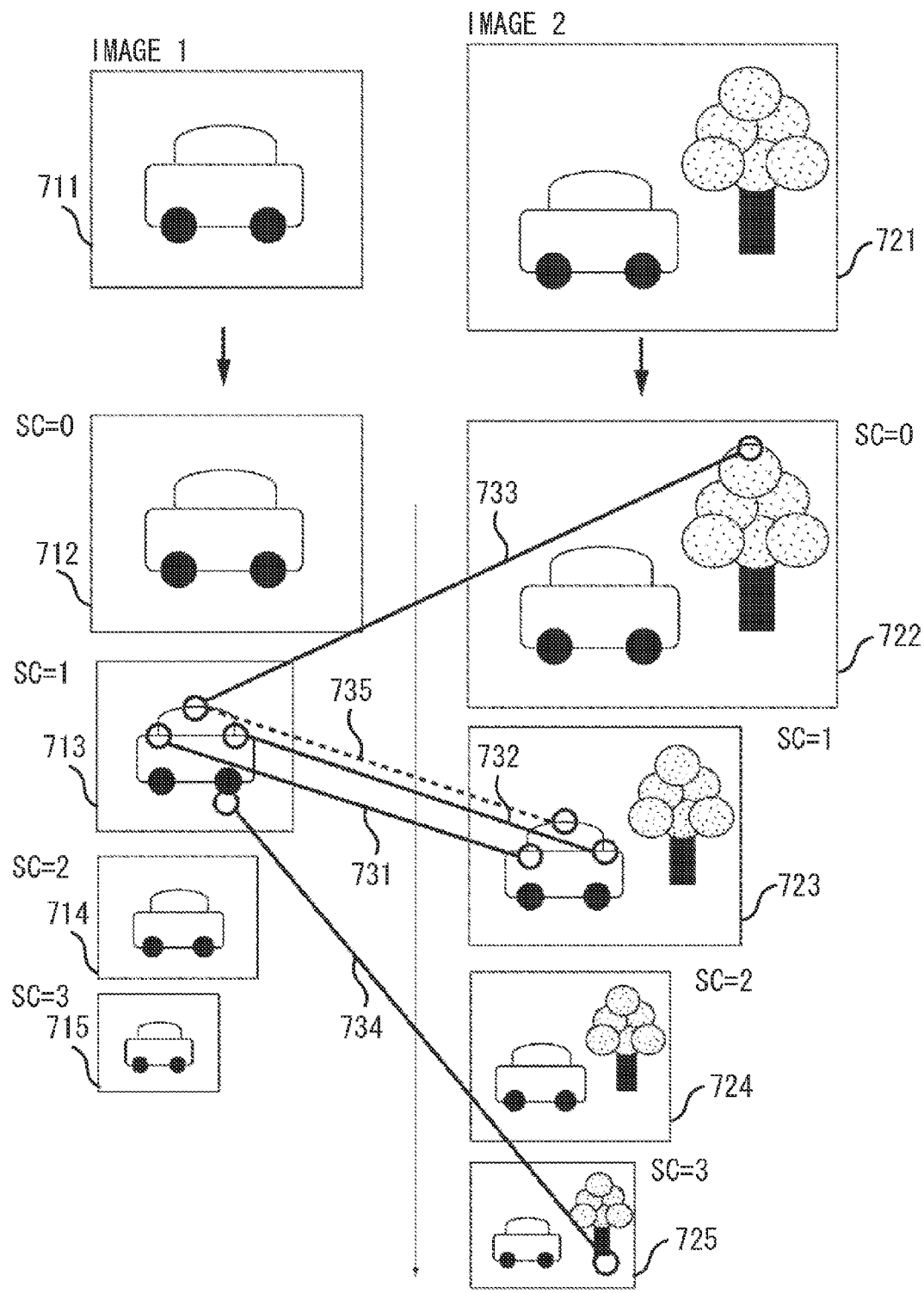
FIG. 7 illustrates an example of a combination of feature points.

Erroneous correspondence will be described using FIG. 7. In FIG. 7, a first image group (712 to 715) generated from an image 1 (first input image) and a second image group (722 to 725) generated from an image 2 (second input image) are compared.

First, the extraction unit 203 extracts a feature point from images 712 to 715 (first image) that the first image group includes and images 722 to 725 (second image) that the second image group includes. Next, the extraction unit 203 calculates a local feature amount for each feature point. The determination unit 204 compares a local feature amount of each feature point between the first image group and the second image group to generate a corresponding point list. At this time, it is assumed that combinations 731 to 734 are obtained.

Both combinations 731 and 732 are combinations extracted from feature points of reduced image 713 and feature points of reduced image 723. When a vehicle which is an object of image 713 and a vehicle which is an object of image 723 are close in size to each other in a unit of pixel, combinations of feature points having a similar local feature amount as combinations 731 and 732 are concentrated.

When combinations are concentrated in image 713 and image 723, there is a high possibility that combinations are also concentrated in image 712 and image 722, image 714 and image 724, and image 715 and image 725 which have a similar relation.

On the other hand, when a combination is determined in order from that which has high similarity of a local feature amount, erroneous correspondence as combinations 733 and 734 may also be acquired. In the combination 733, a top of a vehicle taken in the image 1 and a top of a tree taken in the image 2 correspond to each other. The reason why the reasonable combination 735 (the combination 735 essentially should be determined instead of combination 733) has not been selected is that a local feature amount of feature points of the combination 733 has been more similar thereto than that of the combination 735 (difference is small).

As this example shows, when many combinations have been obtained between the respective reduced images (image 713 and image 723) which have a specified relation, there is a high possibility that a combination with a reduced image (image 713 and image 722) which departs from a specified relation may include an improper one (erroneous determination). A relation (ratio, difference) between a reduction rate of a first image and a reduction rate of a second image in which a reasonable corresponding point is obtained is determined.

And high weights are assigned to a combination extracted from an image close to the determined relation, and similarity is calculated. Details about such calculation will be described below.

Like an example in FIGS. 7 and 4, the reduction processing is performed with a predetermined reduction rate. Thus, a relation between a reduction rate from a first input image and a reduction rate from a second input image is represented by a difference in a number of reduction times.

Figure 8:
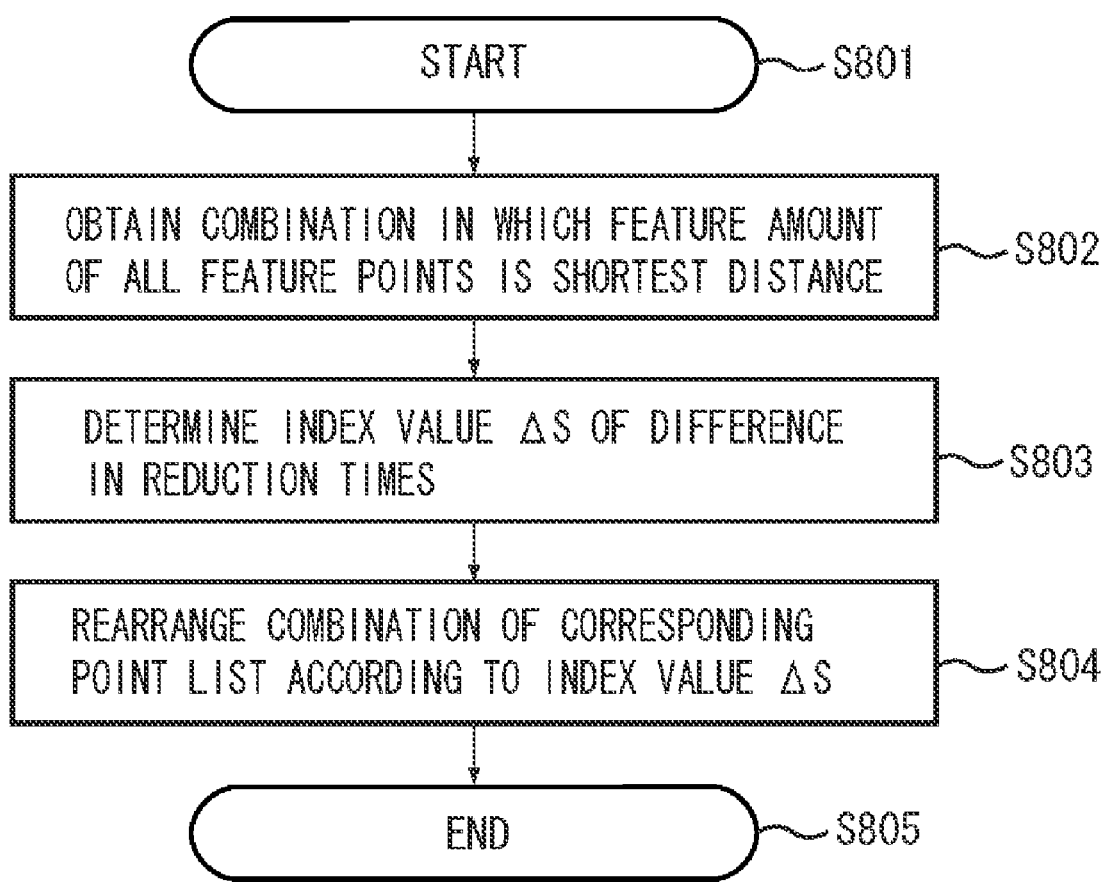
FIG. 8 illustrates a flow chart for calculating an index value $\Delta S$.

FIG. 8 is a flowchart illustrating a calculation procedure of a corresponding point list according to the present exemplary embodiment. Step S801 is a start point.

A feature point of a first image that a first image group includes is Q, its coordinates are Q(x',y'), and a local feature amount of its feature point is Vq. Further, a feature point of a second image that a second image group includes is S, its coordinates are S(x,y), and a local feature amount of its feature point is Vs.

First, in step S802, the extraction unit 203 calculates a feature amount distance (difference in local feature amount) between Vq and Vs for all combinations. Then, the determination unit 204 determines a combination of feature points having minimum Vq and Vs, collects determination results, and generates a corresponding point list.

Next, in step S803, the determination unit 204 determines a difference in a number of reduction times SC of a reduced image in which combinations of the feature points are concentrated. The determination unit 204 determines a statistical value such as an average value, a median value, a most frequent value and a distribution value with respect to a difference in a number of the reduction times SC which are calculated from a plurality of combinations. The determination unit 204 determines the statistical value as an index value ΔS. In this case, with respect to a corresponding point list generated in step S802, a difference in the number of reduction times (SC) of a reduced image in which combinations of feature points are most highly concentrated is set as the index value ΔS.

In step S804, a corresponding point list is rearranged in order starting from a combination having a difference in a number of reduction times which is closest to the index value ΔS from among combinations according to the index value ΔS. Then, the processing is completed in step S805.

Next, a similarity calculation method in the present exemplary embodiment will be described. A combination of a feature point (query feature point) of a first image (query image) and a feature point (sample feature point) of a second image (sample image) corresponding to this feature point is generated as a corresponding point list by the above-described processing. Next, several sets of combinations are randomly selected from a corresponding point list. For these several sets of combinations, a transformation matrix which can accurately transform coordinates of feature points in the sample image into coordinates of feature points in the query image is calculated.

It is voted whether other combinations can also accurately be transformed every time a candidate of a transformation matrix is calculated. Then, a vote number of a geometrical transformation matrix having a most excellent transformation results is adopted as a degree of similarity. It is determined that there is similarity when a position of feature points in the query image and a position of feature points in the sample image selected from a corresponding point list in which local feature amounts are similar to each other have a predetermined position relation represented by a transformation matrix, and when other combinations can also be reasonably transformed.

Figure 6:
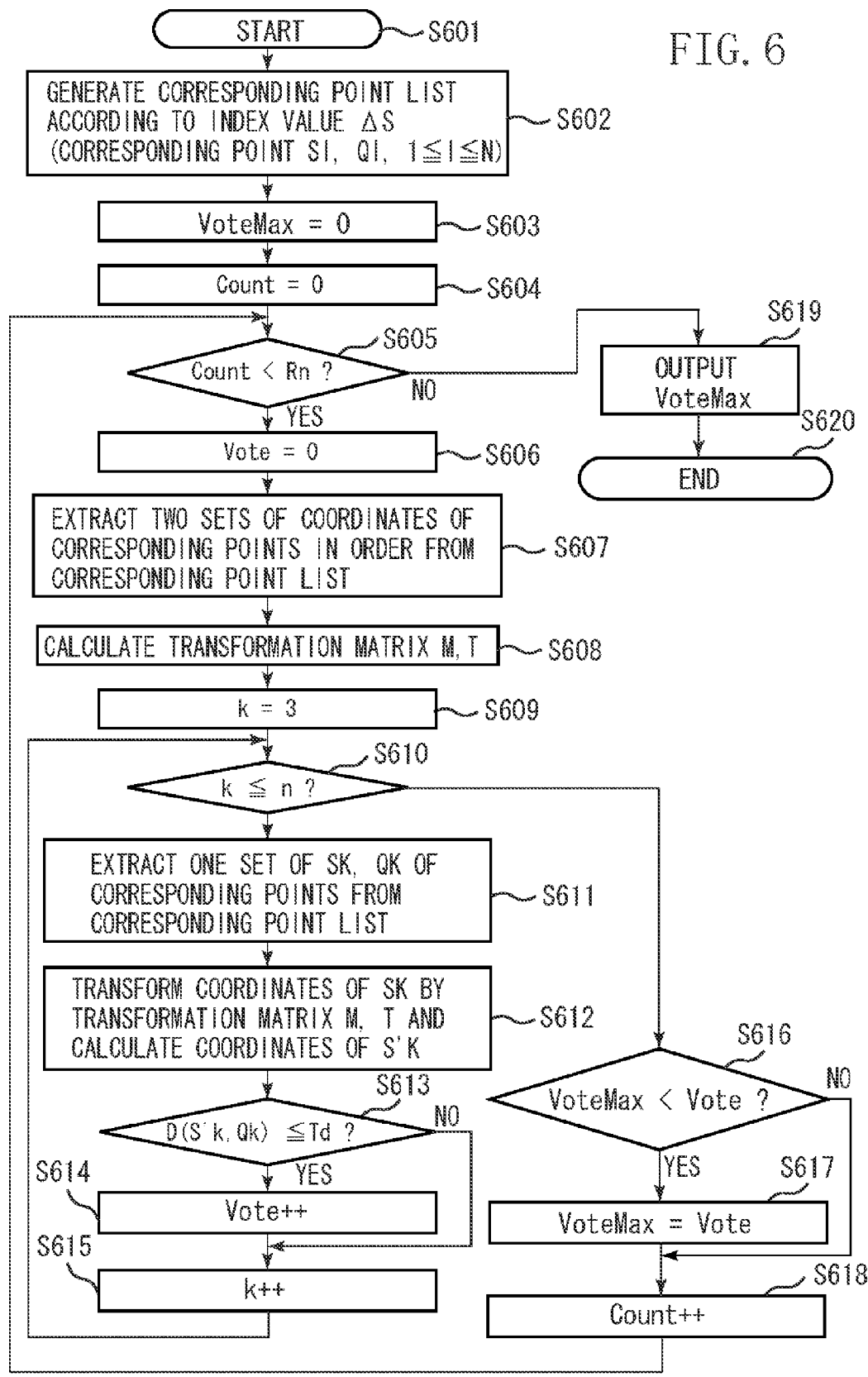
FIG. 6 illustrates a flow chart for calculating similarity.

FIG. 6 is a flowchart illustrating the details of the above-described processing and illustrates a calculation procedure of similarity in steps S603 to S620 which is carried out by the calculation unit 205 in the present exemplary embodiment.

Step S601 is a start point. First, in step S602, the determination unit 204 generates a corresponding point list according to the index value ΔS by the processing in FIG. 8.

For a k-th corresponding point registered in a corresponding point list, a local feature amount of the corresponding point is described as Vq(k) and Vs(k) respectively. Further, feature points which correspond to Vq(k) and Vs (k) are described as Qk and Sk, and coordinates are described as Qk(x'k, y'k) and Sk(xk, yk) by adding a suffix. Further, a number of corresponding point combinations registered in a corresponding point list, which is generated in step S602, is set to m.

In step S603, a variable VoteMax which represents a final vote number is initialized to be zero. In step S604, a variable Count which represents a repeat count number of similarity calculation processing is initialized to be zero.

In step S605, end determination is executed and it is determined that the repeat count number Count does not exceed the predetermined maximum repeat processing time Rn. When it exceeds, the processing proceeds to step S619 and the final vote number VoteMax is output. Further, the processing proceeds to step S620 and this processing ends. Further, in step S605, when the repeat count number Count does not exceed the maximum repeat processing time Rn, the processing proceeds to step S606. A variable Vote which represents a vote number is initialized to be zero.

In step S607, two sets of combinations of corresponding points are extracted in order from a corresponding point list. Coordinates of feature points which belong to these combinations are described as Q1(x'1,y'1) and S1(x1,y1), and Q2(x'2,y'2) and S2(x2,y2).

Next, in step S608, assuming that Q1(x'1,y'1) and S1(x1, y1), and Q2(x'2,y'2) and S2(x2,y2) extracted in step S607 satisfies transformation shown in equation (8), variables a to f in equation (8) are determined. In step S608, a matrix including variables a to d is represented by M and a matrix including variables e to f is represented by T.

$$\begin{pmatrix} x'_k \\ y'_k \end{pmatrix} = \begin{pmatrix} a & b \\ c & d \end{pmatrix} \begin{pmatrix} x_k \\ y_k \end{pmatrix} + \begin{pmatrix} e \\ f \end{pmatrix} \qquad (8)$$

In the first exemplary embodiment, for the sake of simplicity, only similarity transformation is considered. At this time, the above-described equation (8) is rewritten as the following equation (9):

$$\begin{pmatrix} x'_k \\ y'_k \end{pmatrix} = \begin{pmatrix} a & -b \\ b & a \end{pmatrix} \begin{pmatrix} x_k \\ y_k \end{pmatrix} + \begin{pmatrix} e \\ f \end{pmatrix} \qquad (9)$$

At this time, variables a, b, e and f are represented by following equations (10) to (13) using x'1, y'1, x1, y1, x'2, y'2, x2 and y2.

$$a = \frac{(x_1 - x_2)(x'_1 - x'_2) + (y_1 - y_2)(y'_1 - y'_2)}{(x_1 - x_2)^2 + (y_1 - y_2)^2} \qquad (10)$$

-continued $$b = \frac{(x_1 - x_2)(y'_1 - y'_2) - (y_1 - y_2)(x'_1 - x'_2)}{(x_1 - x_2)^2 + (y_1 - y_2)^2} \quad (11)$$

$$e = \frac{(y'_1 - y'_2)(x_1y_2 - x_2y_1) - (x'_1 + x'_2)(x_1x_2 + y_1y_2) +}{x'_1(x_2^2 + y_2^2) + x'_2(x_1^2 + y_1^2)} \quad (12)$$

$$f = \frac{(x'_1 - x'_2)(y_1x_2 - y_2x_1) - (y'_1 + y'_2)(y_1y_2 + x_1x_2) +}{y'_1(y_2^2 + x_2^2) + y'_2(y_1^2 + x_1^2)} \quad (13)$$

Next, in order to select a point other than two sets of points randomly extracted from the corresponding point list in step S607, in step S609, a corresponding point selection variable k is initialized to be 3.

Then, in step S610, it is determined whether the corresponding point selection variable k exceeds a number m of corresponding point combinations registered in the corresponding point list. If the corresponding point selection variable k exceeds the number m of corresponding point combinations, the processing proceeds to step S616. If it is determined in step S610 that the corresponding point selection variable k does not exceed the number m of corresponding point combinations registered in the corresponding point list, the processing proceeds to step S611.

In this step S611, a point other than two sets of points S1(x1, y1) and S2(x2, y2) is extracted from the corresponding point list in the above-described step S607. In the first present exemplary embodiment, the extracted point is described as Sk(xk, yk).

Next, in step S612, coordinate Sk'(x'k, y'k) is obtained by transforming Sk(xk, yk) using equation (9).

Thereafter, in step S613, a geometrical distance between the coordinates Sk'(x'k, y'k) and the coordinates Qk(x'k, y'k) is calculated according to a Euclidean distance. It is determined whether the Euclidean distance is not larger than a threshold value Td. When the Euclidean distance is the threshold value Td or smaller, the processing proceeds to step S614. A vote number Vote is incremented and the processing then advances to step S615. On the other hand, when the Euclidean distance is larger than the threshold value Td, the processing advances to step S615 without executing anything.

In step S615, the corresponding point selection variable k is incremented, and then the processing returns to step S610. The above-described processing is repeated until the corresponding point selection variable k exceeds the combination number m of corresponding points registered in the corresponding point list.

Next, processing in step S616 will be described which is performed when the corresponding point selection variable k exceeds the combination number m of corresponding points registered in the corresponding point list in step S610. In step S616, the value of the vote number Vote and the value of the final vote number VoteMax are compared. When the value of the vote number Vote is larger than the value of the final vote number VoteMax, the processing proceeds to step S617.

In this step S617, the value of the final vote number VoteMax is replaced with the value of the vote number Vote. Then, in step S618, the repeat count number Count is incremented. The processing then returns to step S605.

Further, in step S616, when the value of the vote number Vote is not larger than the value of the final vote number VoteMax, the processing proceeds to step S618. The repeat count number Count is incremented. The processing then returns to the above-described step S605.

By the processing above, a reasonable relation between a first image and a second image is determined. A low priority is given to a combination of feature points which deviates from the reasonable relation as erroneous correspondence and similarity is calculated. Thus, a reduction in accuracy of similarity which causes erroneous correspondence can be suppressed.

Other than the one described above, in a corresponding point list generated in order from the one closest to an index value $\Delta S$, a combination up to a predetermined number is used in comparing similarity. Thus, a processing load can be reduced while maintaining processing accuracy.

Other than the above, in order to give a high priority to a feature point of an image which is close to a reasonable relation, in the vote processing in step S614, the vote may be performed by assigning weights to a corresponding point having a difference in a number of reduction times which is close to the index value $\Delta S$. In this case, a larger weight is given to the corresponding point which is closer to the index value $\Delta S$. For example, it is useful that the weight is changed based on a distribution of a difference in each reduced image step centering around the index value $\Delta S$.

At this time, various distributions such as a normal distribution, weighting based on a Mahalanobis distance or the like may be employed. Specific description will be made using FIG. 7. When an index value $\Delta S=0$ has been calculated, a vote number of a combination of feature points (731,732) extracted from image 713 and image 723 in which $\Delta S=0$, is multiplied by 1. On the other hand, low weights are assigned when $\Delta S=1$, and a vote number of combination (733) is multiplied by 0.5, or when $\Delta S=2$, combination (734) is multiplied by 0.25.

Further, in the similarity calculation method in the present exemplary embodiment, in step S619, the final vote number VoteMax of a transformation matrix is output as a degree of similarity. However, the present invention is not limited to this. Other element may be defined as a similarity degree. For example, processing after step S604 is not executed the combination number m of corresponding points registered in the corresponding point list generated in step S603 may be output as the similarity degree.

Furthermore, the similarity calculation method in the present exemplary embodiment has been described considering only similarity transformation. However, other geometrical transformation such as affine transformation can be employed by determining a transformation matrix corresponding to respective methods in step S608. For example, in affine transformation, first in step S607, a number of coordinates of corresponding points to be selected is set to 3. Next, in step S608, instead of the equation (11), the equation (10) is used. Thus, variables a to f may be determined using three sets of corresponding points (total six points) selected in step S607.

As described above, since similarity can be calculated while an influence of erroneous correspondence is reduced, a decrease in the similarity degree due to erroneous correspondence can be suppressed when two images have been compared.

Further, in the above-described exemplary embodiment, the similarity degree is calculated by assigning high weights to a combination showing a difference in a number of reduction times determined by the determination unit 204. However, a combination may be determined again between images which relate to a difference in a number of reduction times determined by the determination unit 204.

In this case, in step S804, the determination unit 204 may consider the index value ΔS to generate a corresponding point list.

There has been a high possibility that erroneous correspondence shown in FIG. 7 occurs since a combination is determined by determining a feature point of a second image group showing a local feature amount most similar to a local feature amount of a feature point of a first image group. If a combination is determined only between images which satisfy the index value ΔS, the erroneous correspondence is reduced. For example, when the index value ΔS=0, a combination is determined from image 712 and image 722, image 713 and image 723, image 714 and image 724, and image 715 and image 725.

Further, image search processing is one example of image comparison processing. The image search processing is separated into processing for registering an image intended for search, and processing for searching an image similar to an image (hereinafter, query image) that a user takes out and inputs from the registered image as a search condition.

The image similar to the query image may be an image having an object similar to an object that the query image includes. This registration processing and search processing may be realized as a system with another apparatus which is separately prepared.

Figure 9:
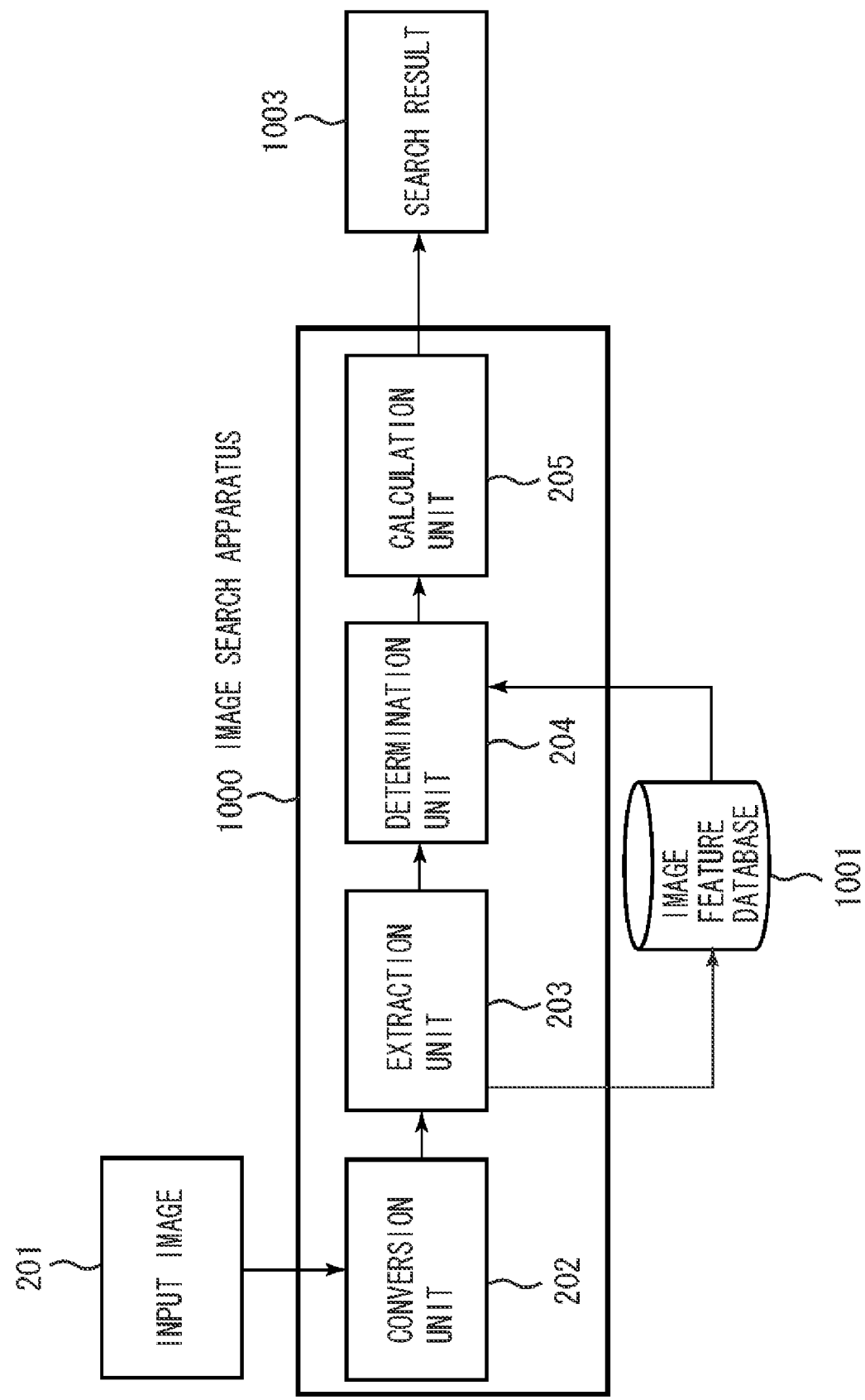
FIG. 9 illustrates a configuration of an image search apparatus.

FIG. 9 is a block diagram illustrating a configuration example of an image comparison apparatus (hereinafter image search apparatus 1000) according to the exemplary embodiment. The same reference numeral will be appended to a configuration and a process having the same function as the first exemplary embodiment. The description will be omitted for those which have the same configuration and function. As shown in FIG. 9, the image search apparatus 1000 includes the conversion unit 202, the extraction unit 203, the determination unit 204, the calculation unit 205, and image feature database 1001.

Also in the first exemplary embodiment, in order to compare a first image and a second image, it is necessary for the determination unit 204 and the calculation unit 205 to write data to be temporarily stored, to the RAM 103. In the present exemplary embodiment, information about a feature point, a local feature amount and a difference in a number of reduction times extracted by the extraction unit 203 is associated therewith and stored in the image feature database 1001. When an image is stored, an image identification (ID) for identifying an image to be registered is allocated thereto and managed.

By dealing beforehand with information necessary to execute comparison processing in the first exemplary embodiment, search time after a search condition is provided can be reduced.

When search is executed, first, the input image 201 (hereinafter, query image) as a search condition is transmitted to the image search apparatus 1000. The query image 201 is input from a network scanner, a digital still camera, an external storage device, or a scanner 109 communicably connected by the NCU 108 in FIG. 1.

Then, as to the query image, the conversion unit 202 and the extraction unit 203 collect information about a feature point, a local feature amount, and a difference in a number of reduction times by the processing similar to the registration processing.

Next, the determination unit 204 and the calculation unit 205 compare information about the query image and information about the sample image from the image feature database 1001 to determine the similarity degree. The sample image is a set of images. For each sample image, the similarity to the query image is calculated. An image showing the similarity which is not less than a threshold value is output as a search result 1003.

Figure 10:
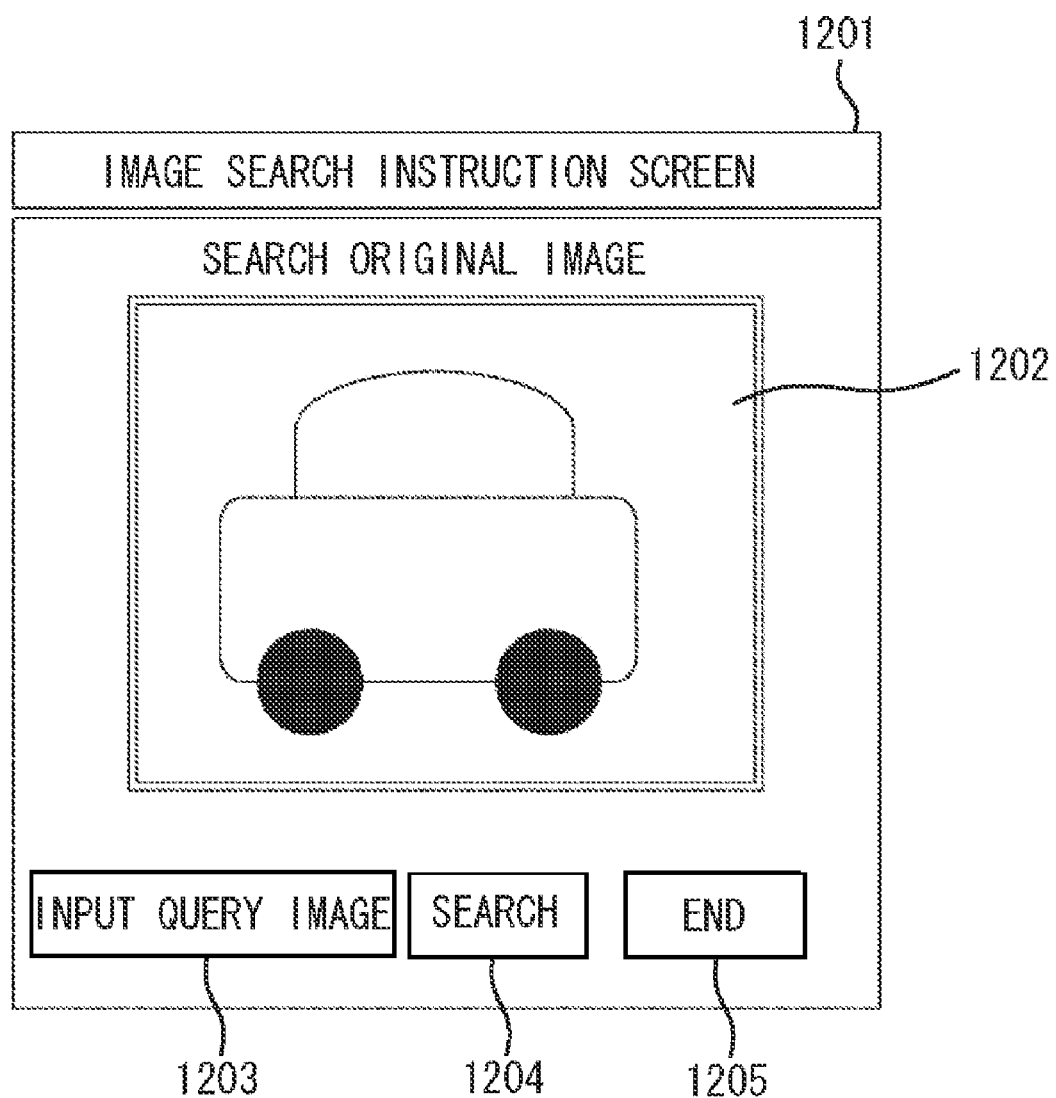
FIG. 10 illustrates an example of GUI which inputs a search instruction.

FIG. 10 is a diagram illustrating one example of a screen (hereinafter, referred to as window) to which the query image is input in the present exemplary embodiment. A title 1201 is a part in which a title of this window is displayed and an operation on the entire image, for example a change of a size is executed.

A button 1203 causes the image search apparatus 1000 to input a query image which is used in search. When the button 1203 is pressed, a window for designating the query image is opened and input processing of the query image is executed. In an area 1202, a thumbnail of the query image input in a search source is displayed.

A button 1204 causes the image search apparatus 1000 to search for an image similar to the query image in the area 1202. When this button is pressed, search processing is executed based on the query image which is displayed at present. A button 1205 finishes the processing.

Figure 11:
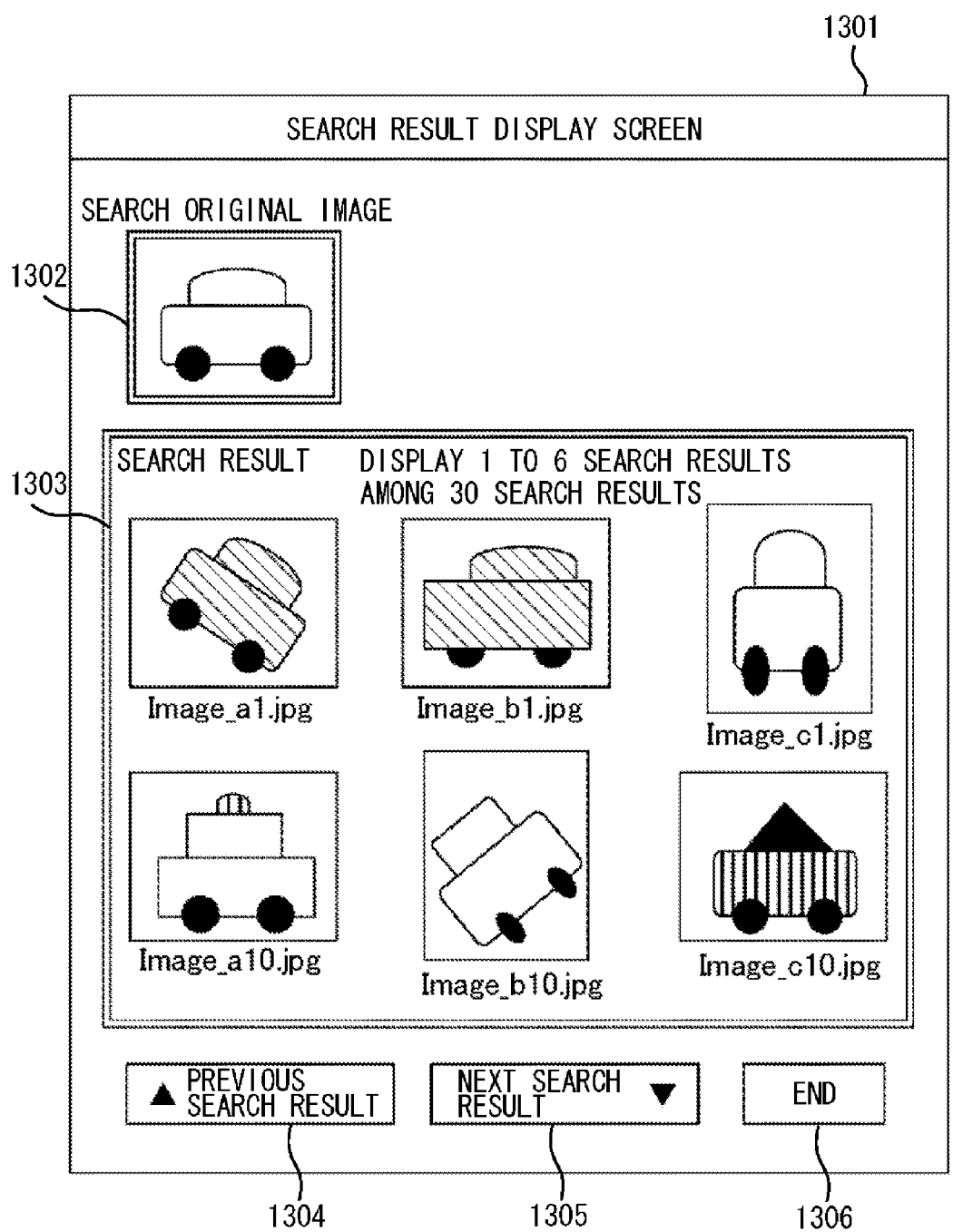
FIG. 11 illustrates an example of GUI which outputs a search result.

FIG. 11 is a diagram illustrating one example of a screen when a list of a search result is displayed according to the exemplary embodiment of the present invention. FIG. 11 shows a search result 1106 in FIG. 10. This is an example of a screen when a window system is utilized by a dedicated application. However, a similar function may also be provided by a web browser.

A title bar 1301 indicates that this window is a search result. An area 1302 is a part in which a thumbnail of a query image which has been provided by a search source is displayed. An area 1303 is an area for displaying a search result and displays a thumbnail of an image corresponding to an image ID obtained as a search result, an image file name or the like as a list.

A thumbnail is generated by the conversion unit 202 when an image is registered, associated with an image ID, and stored in the external storage device 106 in FIG. 1. When many search results are present and cannot be displayed on one screen, display is executed by a number corresponding to a display size.

In this example, six search results are displayed on each screen. A button 1304 displays six search results preceding a search result which is displayed at present. A button 1305 displays next six search results subsequent to a search result which is displayed at present. Further, in the present exemplary embodiment, a thumbnail and an image filename are displayed. However, the similarity degree determined by the processing in the first exemplary embodiment, metadata to be added to an image or the like may be displayed as detailed information. In addition, a window may be generated anew which displays detailed information about each image such as metadata added to an image when one of thumbnails displayed on the area 1303 is selected.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-273187, filed Oct. 23, 2008, and Japanese Patent Application No. 2008-273188, filed Oct. 23, 2008, which are hereby incorporated by reference herein in their entirety.

What is claimed is:

1. An image processing apparatus comprising:
   a conversion unit configured to reduce an input image by a predetermined number of times to generate an image group containing the input image;
   an extraction unit configured to extract a plurality of feature points and a local feature amount of each feature point from the image group;
   a determination unit configured to compare a first image of a first image group generated from a first input image by the conversion unit with a second image of a second image group generated from a second input image by the conversion unit, and to determine a relation between the first image and the second image in which a size of an object of the first image and that of the second image get closer; and
   a calculation unit configured to assign high weights to a combination of feature points extracted from images having the relation determined by the determination unit to calculate a similarity degree between the first input image and the second input image.

2. The image processing apparatus according to claim 1, wherein the determination unit determines a feature point of the second image group having a local feature amount similar to a local feature amount of each feature point of the first image group as a combination.

3. The image processing apparatus according to claim 1, wherein the extraction unit extracts a position of respective feature points and the calculation unit generates a transformation matrix based on a position relation of each feature point to calculate reasonableness of the transformation matrix as the similarity degree.

4. The image processing apparatus according to claim 1, further comprising:
   an output unit configured to output information concerning the second image having an object similar to an object of the first image as a search result.

5. The image processing apparatus according to claim 1, wherein the determination unit regards a feature point of the second image group having a local feature amount similar to each of the feature points of the first image group as a corresponding feature point based on a degree of similarity of a local feature amount of each feature point, and
   wherein the determination unit determines a ratio or a difference between a reduction rate of the first image and a reduction rate of the second image in which the corresponding feature point frequently appears as a relation in a case where the size of the object of the first image and that of the second image get closer.

6. An image processing apparatus comprising:
   a conversion unit configured to reduce an input image by a predetermined number of times to generate an image group containing the input image;
   an extraction unit configured to extract a plurality of feature points and a local feature amount of each feature point from the image group;
   a determination unit configure to compare a first image of a first image group generated from a first input image by the conversion unit with a second image of a second image group generated from a second input image by the conversion unit, and to determine a relation between the first image and the second image in which a size of an object of the first image and that of the second image get closer; and
   a calculation unit configured to determine, as to the first image and the second image which are in the relation determined by the determination unit, a combination of feature points in which local feature amounts are similar to each other, and to calculate a similarity degree between the first input image and the second input image based on the combination.

7. The image processing apparatus according to claim 6,
   wherein a feature point of the second image group having a local feature amount similar to each of the feature points of the first image group is regarded as a corresponding feature point based on a degree of similarity of a local feature amount of each feature point, and
   wherein a ratio or a difference between a reduction rate of the first image and a reduction rate of the second image in which the corresponding feature point frequently appears is determined as a relation in a case where the size of the object of the first image and that of the second image get closer.

8. An image processing method performed using a computer or a processor, the method comprising:
   reducing an input image by a predetermined number of times to generate an image group containing the input image;
   extracting a plurality of feature points and a local feature amount of each feature point from the image group;
   comparing a first image of a first image group generated from a first input image with a second image of a second image group generated from a second input image;
   determining a relation between the first image and the second image in which a size of an object of the first image and that of the second image get closer; and
   assigning high weights to a combination of feature points extracted from images having the determined relation to calculate a similarity degree between the first input image and the second input image.

9. A non-transitory computer-readable storage medium storing a program causing a computer to execute a method, the method comprising:
   reducing an input image by a predetermined number of times to generate an image group containing the input image;
   extracting a plurality of feature points and a local feature amount of each feature point from the image group;
   comparing a first image of a first image group generated from a first input image with a second image of a second image group generated from a second input image;
   determining a relation between the first image and the second image in which a size of an object of the first image and that of the second image get closer; and
   assigning high weights to a combination of feature points extracted from images having the determined relation to calculate a similarity degree between the first input image and the second input image.

10. An image processing method performed using a computer or a processor, the method comprising:

reducing an input image by a predetermined number of times to generate an image group containing the input image;

extracting a plurality of feature points and a local feature amount of each feature point from the image group;

comparing a first image of a first image group generated from a first input image with a second image of a second image group generated from a second input image, and determining a relation between the first image and the second image in which a size of an object of the first image and that of the second image get closer; and determining, as to the first image and the second image which are in the determined relation, a combination of feature points in which local feature amounts are similar to each other, and calculating a similarity degree between the first input image and the second input image based on the combination.

11. A non-transitory computer-readable storage medium encoded with computer-executable instructions for executing a method comprising:

reducing an input image by a predetermined number of times to generate an image group containing the input image;

extracting a plurality of feature points and a local feature amount of each feature point from the image group;

comparing a first image of a first image group generated from a first input image with a second image of a second image group generated from a second input image, and determining a relation between the first image and the second image in which a size of an object of the first image and that of the second image get closer; and determining, as to the first image and the second image which are in the determined relation, a combination of feature points in which local feature amounts are similar to each other, and calculating a similarity degree between the first input image and the second input image based on the combination.

* * * * *